(12) United States Patent
Baarda et al.

(10) Patent No.: US 10,817,002 B2
(45) Date of Patent: Oct. 27, 2020

(54) GAS VALVE AND GAS CONTROL DEVICE

(71) Applicant: Honeywell Technologies Sarl, Rolle (CH)

(72) Inventors: Gerrit J. Baarda, Emmen (NL); Erwin Kupers, Emmen (NL); Tieme de Jonge, Emmen (NL)

(73) Assignee: Honeywell Technologies Sarl, Rolle (CH)

( * ) Notice: Subject to any disclaimer, the term of this patent is extended or adjusted under 35 U.S.C. 154(b) by 57 days.

(21) Appl. No.: 16/012,387

(22) Filed: Jun. 19, 2018

(65) Prior Publication Data

US 2018/0363792 A1 Dec. 20, 2018

(30) Foreign Application Priority Data

Jun. 20, 2017 (EP) ..................................... 17176872

(51) Int. Cl.
*F16K 1/24* (2006.01)
*F16K 1/50* (2006.01)
(Continued)

(52) U.S. Cl.
CPC ........... *G05D 16/0666* (2013.01); *F16K 1/24* (2013.01); *F16K 1/36* (2013.01); *F16K 1/50* (2013.01);
(Continued)

(58) Field of Classification Search
CPC .... F16K 1/24; F16K 1/36; F16K 1/50; G05D 16/0666; F23N 1/007; F23N 2235/24; F23N 2235/20
(Continued)

(56) References Cited

U.S. PATENT DOCUMENTS

| 717,990 | A | * | 1/1903 | Harvey | ...................... F16K 1/20 251/87 |
| 1,588,411 | A | * | 6/1926 | Groble | ............... G05D 16/0686 137/505.47 |

(Continued)

FOREIGN PATENT DOCUMENTS

| CA | 1056256 A | 6/1979 |
| DE | 616838 C | 1/1936 |

(Continued)

OTHER PUBLICATIONS

European Search Report and Written Opinion for Application No. EP17176872, 5 pages, dated Jun. 12, 2017.
(Continued)

*Primary Examiner* — Umashankar Venkatesan
(74) *Attorney, Agent, or Firm* — Shumaker & Sieffert, P.A.

(57) ABSTRACT

A gas valve includes a valve seat, a valve stem, a valve body, and a valve diaphragm. The valve body acts together with the valve seat in such a way that the gas valve is in a closed state when the valve body is pressed against the valve seat and the gas valve is in an opened state when the valve body is lifted up from the valve seat. In a partially opened state, a connection between the valve stem and the valve body allows the valve body to tilt relative to the valve stem. The tilt may help provide more stable contact between the valve body and the valve seat when the gas valve is in the partially opened state. This can reduce wear on the gas valve by reducing, for example, valve body bounce.

20 Claims, 4 Drawing Sheets

(51) Int. Cl.
*F16K 1/36* (2006.01)
*G05D 16/06* (2006.01)
*F23N 1/00* (2006.01)

(52) U.S. Cl.
CPC .......... *F23N 1/007* (2013.01); *F23N 2235/20* (2020.01); *F23N 2235/24* (2020.01)

(58) Field of Classification Search
USPC .......................................................... 251/87
See application file for complete search history.

(56) References Cited

U.S. PATENT DOCUMENTS

| | | | | |
|---|---|---|---|---|
| 2,898,930 | A | * | 8/1959 | St Clair ............. G05D 16/0694 137/116.3 |
| 3,906,982 | A | * | 9/1975 | Fleischhacker .... G05D 16/0666 137/116.5 |
| 8,740,177 | B2 | | 6/2014 | Walker |
| 2010/0018585 | A1 | * | 1/2010 | Pavin ................. G05D 16/2095 137/66 |
| 2011/0061750 | A1 | | 3/2011 | Roberg |
| 2017/0017244 | A1 | * | 1/2017 | Ishida ....................... F16K 1/36 |

FOREIGN PATENT DOCUMENTS

| | | |
|---|---|---|
| DE | 3212162 U1 | 10/1992 |
| EP | 1030232 A1 | 8/2000 |
| GB | 391663 A | 5/1933 |
| GB | 2156496 A | 10/1985 |
| KR | 2063226 B1 * | 1/2020 ............... F16K 1/36 |

OTHER PUBLICATIONS

"CVI: Integrated Gas Control Safety System," Honeywell, 8 pages, date accessed: May 7, 2019.
Response to Extended Search Report dated Jun. 12, 2017, from counterpart European Application No. 17176872.4, filed Jun. 25, 2019, 29 pp.
Examination Report from counterpart European Application No. 17176872.4, dated Jun. 16, 2020, 9 pp.

* cited by examiner

GAS VALVE AND GAS CONTROL DEVICE

This application claims priority to European Patent Application No. 17 176 872.4, filed Jun. 20, 2017, and entitled "GAS VALVE AND GAS CONTROL DEVICE", which is incorporated herein by reference.

TECHNICAL FIELD

The present patent application relates to a gas valve for a gas control device and to a gas control device.

BACKGROUND

The product leaflet "CVI Integrated Gas Control Safety System, Honeywell B.V., EN4R-0724 9503 RO-NL" discloses a gas control device comprising a safety gas valve, a servo gas valve, a servo gas pressure regulator and a main gas valve. The servo gas valve is used to operate the main gas valve and also often called operator valve. The present application relates to a gas valve which can preferably be used as main gas valve in such a gas control device.

The main gas valve of the gas control device known from the product leaflet "CVI Integrated Gas Control Safety System, Honeywell B.V., EN4R-0724 9503 RO-NL" comprises a valve seat, a valve stem, a valve body, a valve diaphragm plate, a valve diaphragm and a valve spring element. The valve stem is attached with a first end of the same to a first side of valve body. The valve body acts together with the valve seat in such a way that the gas valve is closed when the valve body is pressed against the valve seat, and that the gas valve is opened when the valve body is lifted up from the valve seat. The valve diaphragm plate is mounted to a second end of the valve stem. The valve diaphragm is mounted to the valve diaphragm plate. A first pressure is present on a first side of the valve diaphragm and a second pressure is present on a second side of the valve diaphragm, wherein the pressure difference between said first pressure and said second pressure provides a pressure dependent force acting on the valve stem. The valve spring element provides a spring dependent force acting on the valve stem. The gas valve opens and closes as a function of the pressure dependent force and as a function of the spring dependent force, both acting on the valve stem.

Such existing gas valves have a limited stable modulation range. At low or small opening levels of the gas valve the valve body may oscillate. Due to such an oscillation the valve body may bounce against the valve seat causing wear and noise.

SUMMARY

Against this background, a novel gas valve according to claim 1 is provided. The valve spring of the novel gas valve is acting on a second side of the valve body. The first end of the valve stem and/or the first side of the valve body provides a tilt element of the novel gas valve, the tilt element allowing the valve body to tilt around a defined tilt axis relative to the valve stem. The second end of the valve stem and/or the valve diaphragm plate provides an anti-rotation element of the novel gas valve, the anti-rotation element preventing the valve stem from rotating around a longitudinal valve stem axis. The novel gas valve has a wider stable modulation range. At low or small opening levels of the gas valve, the valve body has a well-defined, partial and stable contact with the valve seat. There is no risk that the valve body bounces against the valve seat.

In a fully closed status of the gas valve, the spring dependent force presses the valve body completely against the valve seat. In a fully opened status of the gas valve, the pressure dependent force lifts up the valve body completely from the valve seat. In a partially opened status of the gas valve, the pressure dependent force lifts up the valve body partially from the valve seat, namely in such a way that a first circumferential section of the valve body which is tilted away from the valve seat is lifted up from the valve seat while a second circumferential section of the valve body which is tilted towards the valve seat is pressed against the valve seat. At low or small opening levels of the gas valve, the valve body has a well-defined, partial and stable contact with the valve seat. The novel gas valve has a wider stable modulation range. There is no risk that the valve body bounces against the valve seat.

According to a preferred embodiment, a longitudinal axis of the valve spring element runs coaxial to a longitudinal axis of the valve seat. Preferably, the tilt axis for the valve body runs perpendicular and offset to the longitudinal axis of the valve seat. At low or small opening levels of the gas valve, the valve body has a well-defined, partial and stable contact with the valve seat. There is no risk that the valve body bounces against the valve seat.

According to a preferred embodiment, the tilt element is provided by a hinge between the first end of the valve stem and the first side of the valve body and by a protrusion at the first end of the valve stem. Preferably, the anti-rotation element is provided by an opening in the valve diaphragm plate through which the second end of the valve stem penetrates. At low or small opening levels of the gas valve, the valve body has a well-defined, partial and stable contact with the valve seat. There is no risk that the valve body bounces against the valve seat.

The gas control device is defined in claim 11.

BRIEF DESCRIPTION OF DRAWINGS

Preferred developments of the novel gas valve are provided by the dependent claims and the description which follows. Exemplary embodiments are explained in more detail on the basis of the drawing, in which:

DESCRIPTION

Figure 1:
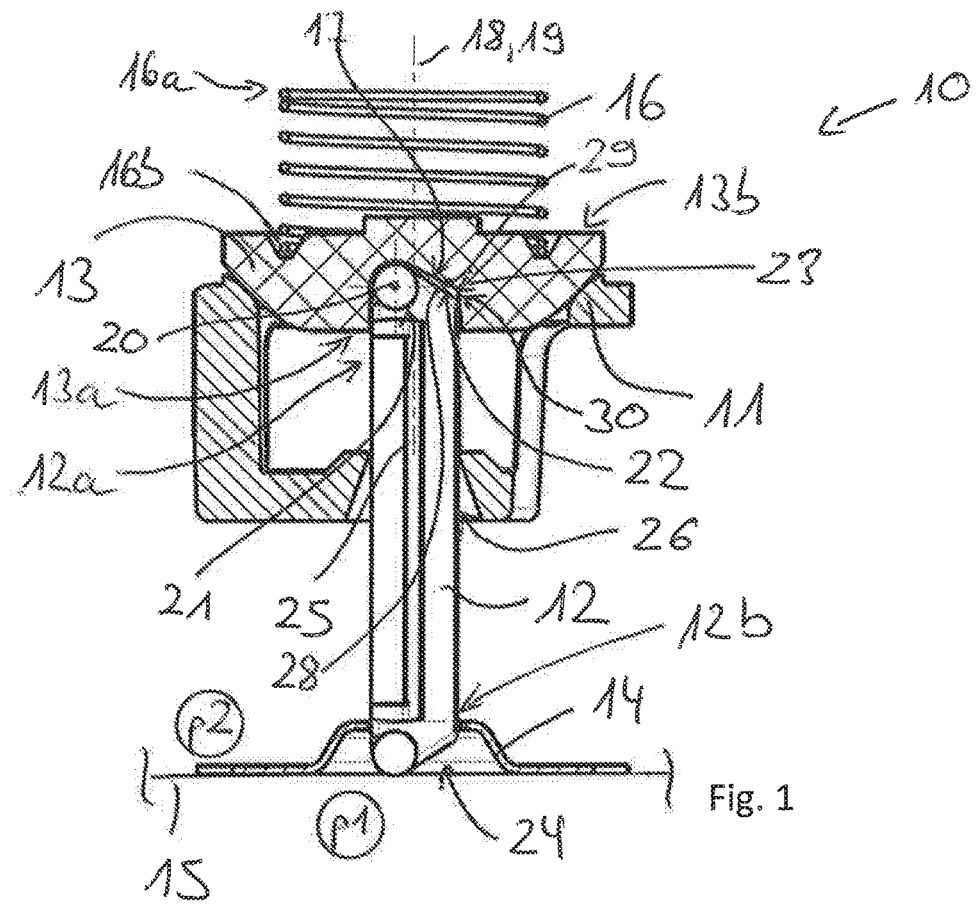
FIG. 1 shows a cross section through a first gas valve according to the present invention in a fully closed status.

FIGS. 1 to 8 show details of a first preferred embodiment of a gas valve 10 according the present invention.

The gas valve 10 of the present application is preferably a so-called main gas valve of a gas control device.

The gas valve 10 comprises a valve seat 11, a valve stem 12, a valve body 13, a valve diaphragm plate 14, a valve diaphragm 15 and a valve spring element 16.

The valve stem 12 is attached with a first end 12a of the same to a first side 13a of valve body 13, namely to a middle or radially inner portion of the first side 13a of the valve body 13.

The valve body 13 acts together with the valve seat 11 in such a way that the gas valve 10 is closed when the valve body 13, namely a peripheral or radially outer portion of the first side 13a of the valve body 13, is pressed against the valve seat. The gas valve 10 is opened when the valve body 13, namely the peripheral or radially outer portion of the first side 13a of the valve body 13, is lifted up from the valve seat 11.

The valve diaphragm plate 14 is mounted to a second end 12b of the valve stem 12.

The valve diaphragm 15 is mounted to the valve diaphragm plate 14.

A first pressure p1—also often called servo gas pressure of the gas valve 10—is present on a first side of the valve diaphragm 15 and a second pressure p2—also often called outlet gas pressure of the gas valve 10—is present on a second side of the valve diaphragm 15. The pressure difference between said first pressure p1 and said second pressure p2 provides a pressure dependent force acting on the valve stem 12.

The valve spring element 16 provides a spring dependent force also acting on the valve stem 12.

The gas valve 10 opens and closes as a function of the pressure dependent force and as a function of the spring dependent force, both acting on the valve stem 12.

The valve spring element 16 is acting on a second side 13b of the valve body 13. Said second side 13b of the valve body 13 is turned away from the valve seat 11. The first side 13a of the valve body 13 to which the first end 12a of the valve stem 12 is mounted is facing the valve seat 11.

The valve spring element 16 acts directly on the second side 13b of the valve body 13. An end 16b of the valve spring element 16 is supported against the second side 13b of the second side 13b of the valve body 13. An opposed end 16a of the valve spring element 16 may be supported against a valve housing (not shown) of the gas valve 10.

A longitudinal axis 18 of the valve spring element 16 runs coaxial to a longitudinal axis 19 of the valve seat 11.

The first end 12a of the valve stem 12 and/or the first side 13a of the valve body 13 provides a tilt element 17 allowing the valve body 13 to tilt around a defined tilt axis 20 relative to the valve stem 12. The tilt axis 20 for the valve body 13 runs perpendicular and offset to the longitudinal axis 19 of the valve seat 11.

The valve body 13 can only tilt around one tilt axis 20 defined by the tilt element 17. A tilting of the valve body 13 around an axis being inclined to said defined tilt axis 20 is prevented by said tilt element 17.

In the embodiment of FIGS. 1 to 8, the tilt element 17 is provided by a hinge 21 between the first end 12a of the valve stem 12 and the first side 13a of the valve body 13 and by a protrusion 22 at the first end 12a of the valve stem 12.

In the embodiment of FIGS. 1 to 8, the hinge 21 is a ball hinge having a ball-like hinge head 21a and a hinge socket 21b receiving said hinge head 21a. The hinge head 21a is part of the first end 12a of the valve stem 12. The hinge socket 21b is part of the valve body 13 at the first side 13a of the same.

The protrusion 22 at the first end 12a of the valve stem 12 defines the tilt direction of the valve body 13 and thereby the tilt axis 20. The tilt axis 20 runs perpendicular to the protrusion 22.

The protrusion 22 at the first end 12a of the valve stem 12 acts together with a recess 23 at the first side 13a of the valve body 13. The protrusion 22 at the first end 12a of the valve stem 12 adjoins the hinge head 21a being also part of the first end 12a of the valve stem 12.

The second end 12b of the valve stem 12 and/or the valve diaphragm plate 14 provides an anti-rotation element 24 preventing the valve stem 12 from rotating around a longitudinal valve stem axis 25. The longitudinal valve stem axis 25 of the valve stem 12 runs coaxial to the longitudinal axis 18 of the valve spring element 16 and to a longitudinal axis 19 of the valve seat 11.

The valve stem 12 is guided in recess 26 of a section of the valve housing (not shown) providing also the valve seat 11. The recess 26 allows a movement of the valve stem 12 in linear direction along the longitudinal valve stem axis 25 as a function of the forces acting on the valve stem 12. The anti-rotation element 24 prevents the valve stem 12 from rotating around the longitudinal valve stem axis 25.

In the embodiment of FIGS. 1 to 8, the anti-rotation element 24 is provided by an opening 27 in the valve diaphragm plate 14 through which the second end 12b of the valve stem 12 penetrates. The opening 27 in the valve diaphragm plate 14 and the second end 12b of the valve stem 12 have both a shape that prevents the valve stem 12 from rotating around the longitudinal valve stem axis 25.

FIG. 1 shows the gas valve 10 in a fully closed status. The spring dependent force is greater than the pressure dependent force so that the valve body 13, namely the peripheral or radially outer portion of the first side 13a of the valve body 13, is completely pressed against the valve seat 11. As can be seen in FIG. 1, an outer edge 28 of the protrusion 22 does not contact a groove base 29 of the recess 23. There is a gap 30 between the outer edge 28 of the protrusion 22 and the groove base 29 of the recess 23.

Figure 2:
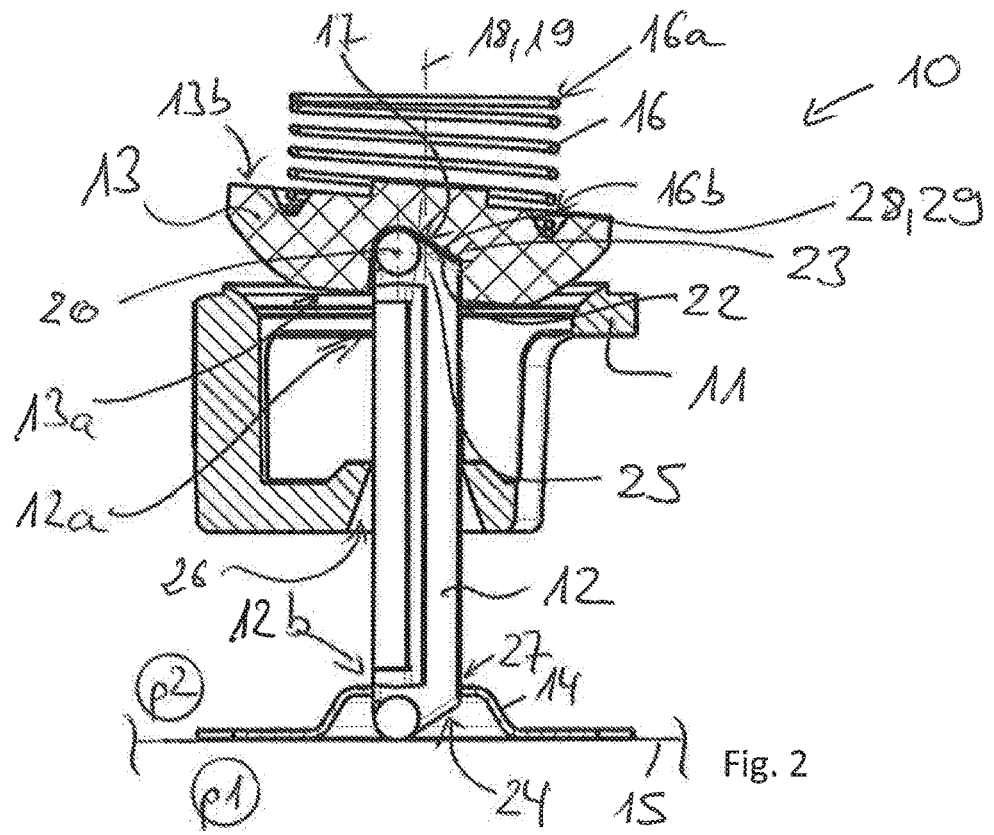
FIG. 2 shows a cross section through the gas valve according to FIG. 1 in a fully opened status.

FIG. 2 shows the gas valve 10 in a fully opened status. The pressure dependent force is greater than the spring dependent force so that the valve body 13, namely the peripheral or radially outer portion of the first side 13a of the valve body 13, is completely lifted up from the valve seat 11. In this status the valve body 13 is tilted around the tilt axis 20 by the valve spring element 16 such that the outer edge 28 of the protrusion 22 contacts the groove base 29 of the recess 23. The gap 30 of FIG. 1 is then disappeared.

Figure 3:
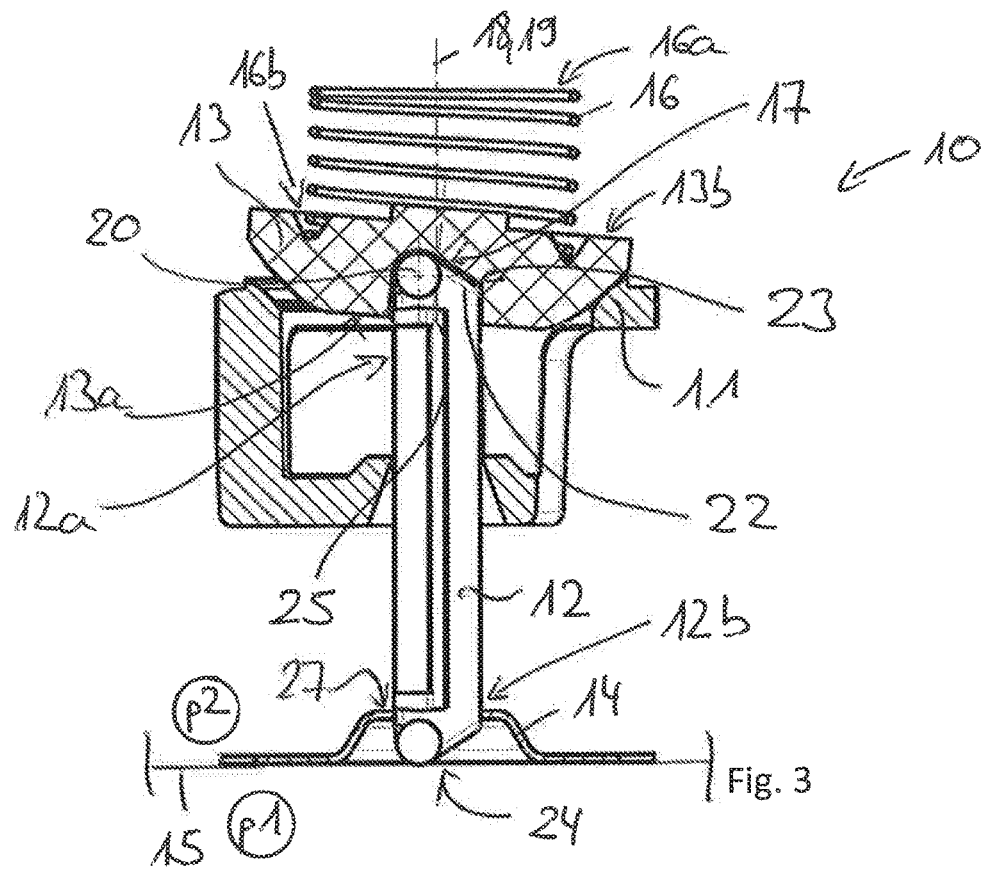
FIG. 3 shows a cross section through the gas valve according to FIGS. 1 and 2 in a partially opened status.
Figure 4:
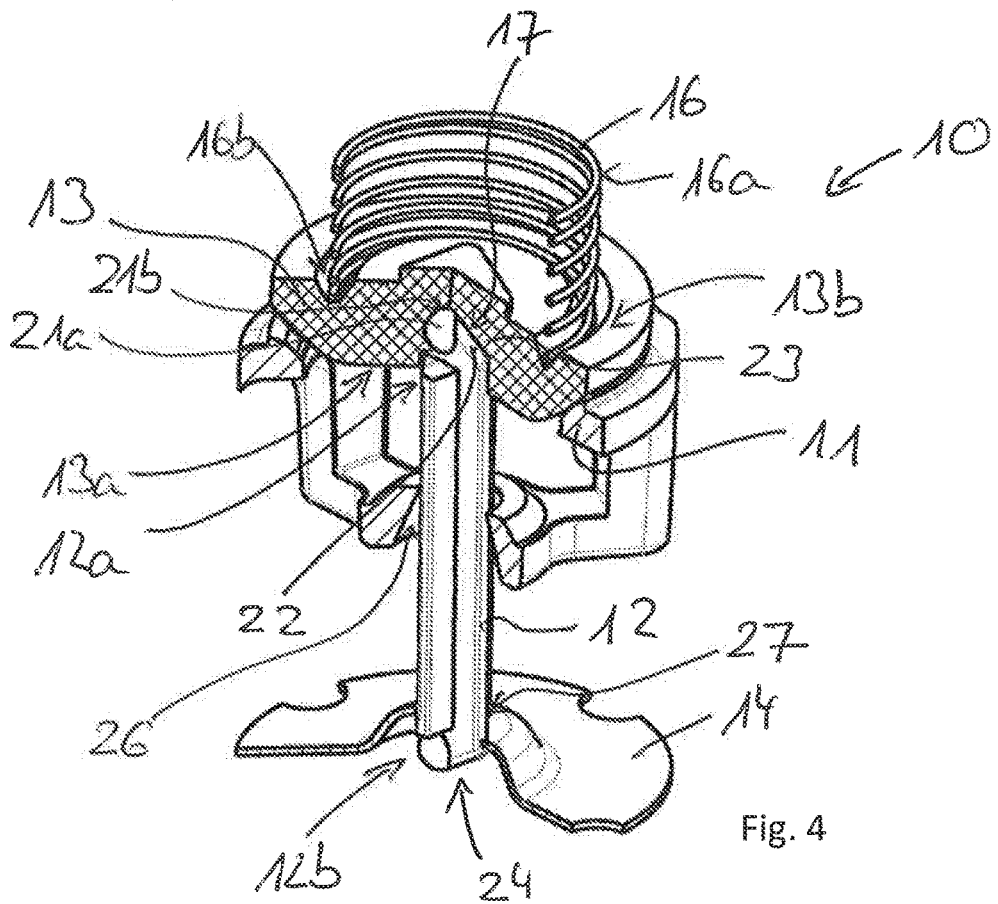
FIG. 4 shows the gas valve of FIG. 3 in a perspective view with a partial cross section through the same, FIG. 5 a first detail of the gas valve of FIGS. 1 to 4.
Figure 5:
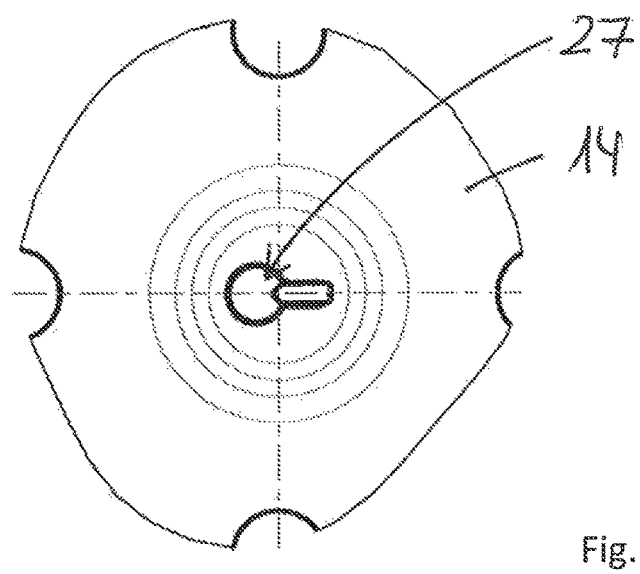
Figure 6:
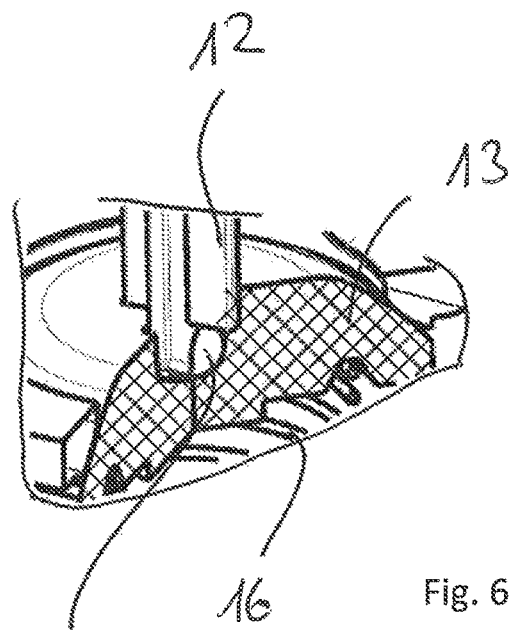
FIG. 6 a second detail of the gas valve of FIGS. 1 to 4.
Figure 7:
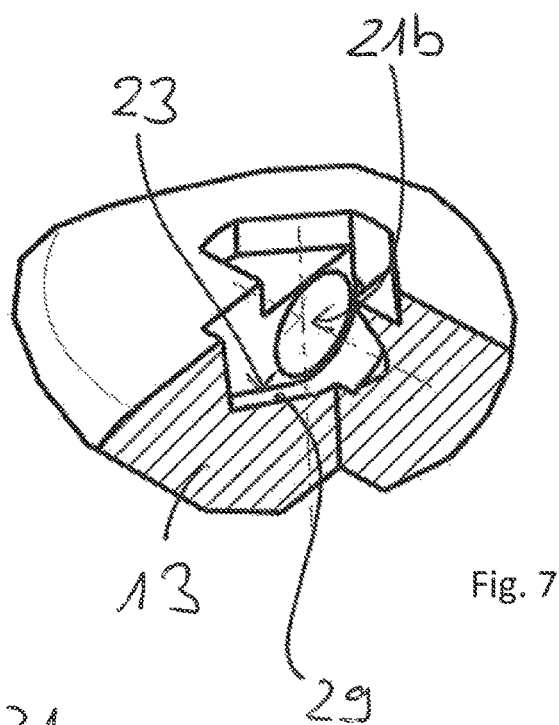
FIG. 7 a third detail of the gas valve of FIGS. 1 to 4.
Figure 8:
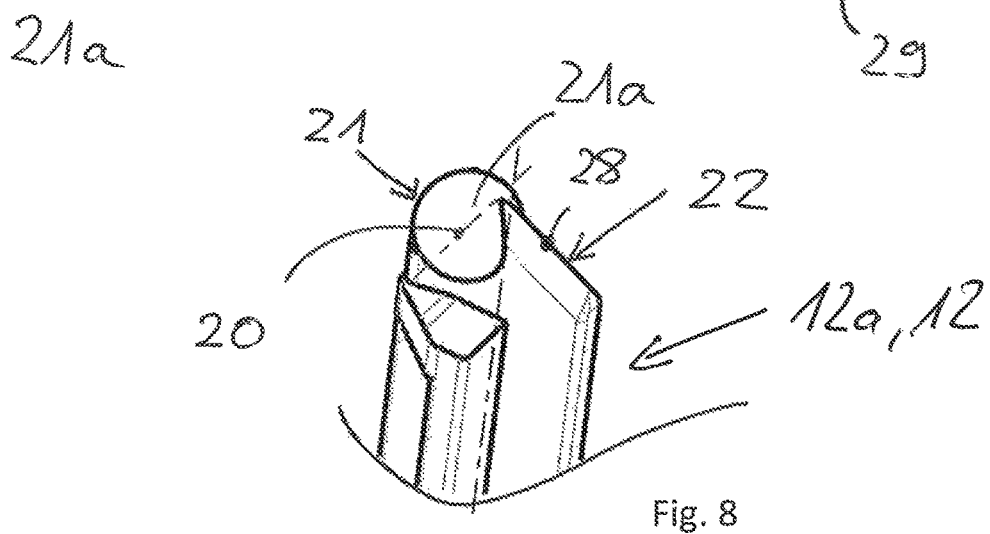
FIG. 8 a fourth detail of the gas valve of FIGS. 1 to 4.

FIG. 3 shows the gas valve 10 in a partially opened status at a low or small opening level of the same. The pressure dependent force lifts up the valve body 13, namely the peripheral or radially outer portion of the first side 13a of the valve body 13, partially from the valve seat 11, namely in such a way that a first circumferential section of the valve body 13 is lifted up from the valve seat 11 while a second circumferential section of the valve body 13 which is tilted towards to the valve seat 11 around the tilt axis 20 is pressed against the valve seat 11.

The valve body 13 has a well-defined, partial and stable contact with the valve seat 11. The gas valve 10 has a wider stable modulation range.

Figure 9:
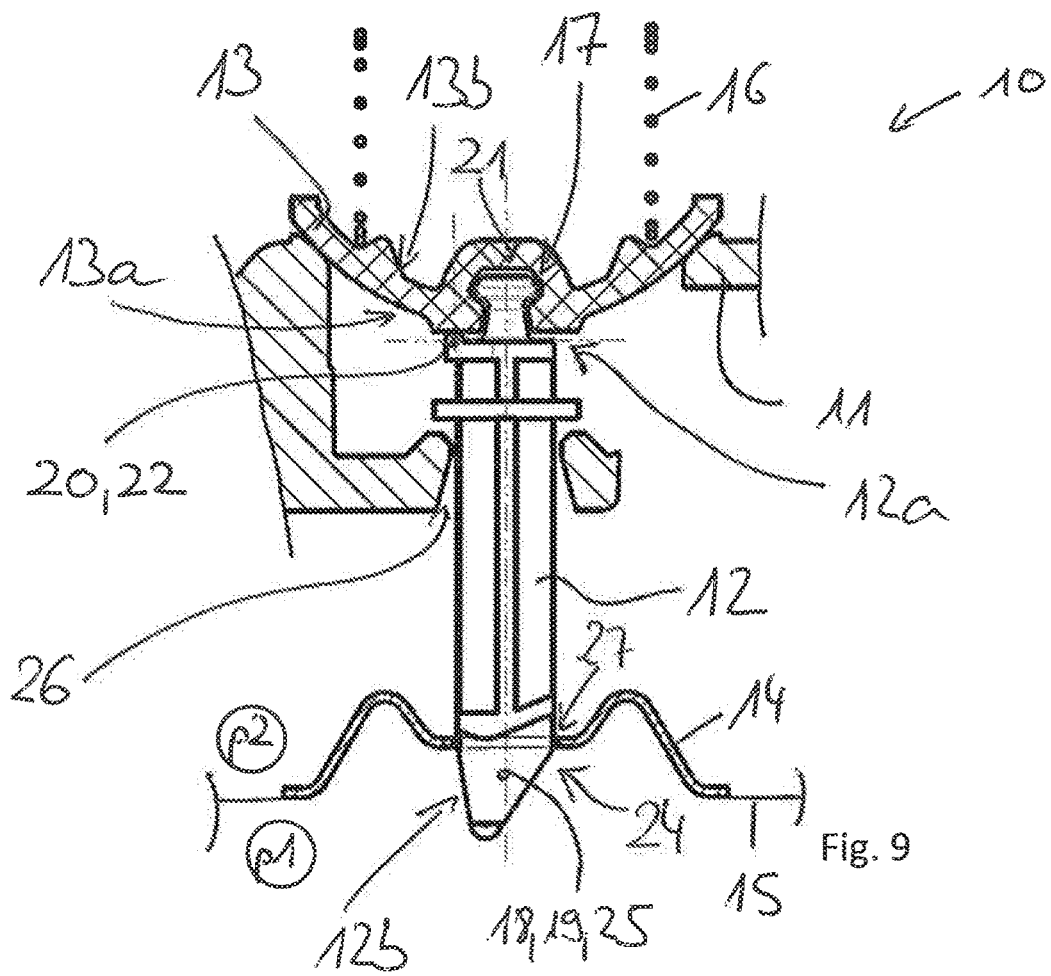
FIG. 9 shows a cross section through a second gas valve according to the present invention, FIG. 10 a detail of the gas valve of FIG. 9.
Figure 10:
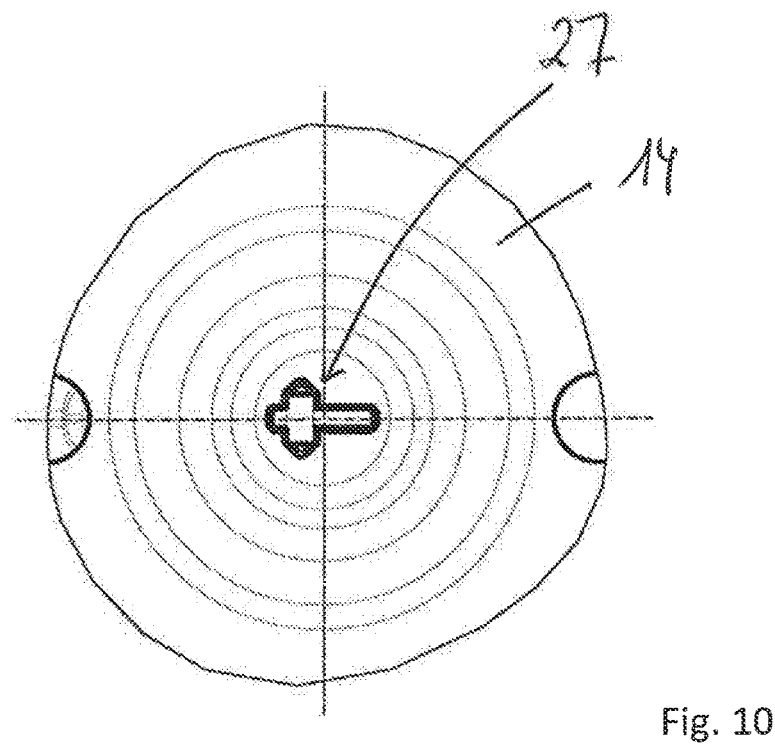

FIGS. 9, 10 show details of a second preferred embodiment of a gas valve 10 according the present invention. The basic concept and functionality of the gas valve 10 according FIGS. 9, 10 is identical to the gas valve according to FIGS. 1-8. The gas valve 10 according FIGS. 9, 10 differs from the gas valve according to FIGS. 1-8 from the specific design of the tilt element 17. In FIGS. 9, 10 the tilt element 17 is also provided by by a hinge 21 between the first end 12a of the valve stem 12 and the first side 13a of the valve body 13 and by a protrusion 22 at the first end 12a of the valve stem 12. A hinge head 21a of the hinge 21 provided at the first end 12a of the valve stem 12 is received by a hinge socket 21b provided at the first side 13b of the valve body 13. A gap between the hinge head 21a and the hinge socket 21b allows a movement of the valve body 13 relative to the valve stem 12. The protrusion 22 at the first end 12a of the valve stem 12 defines the tilt axis 20 around which the valve body 13 can tilt relative to the valve stem 12 when opening the gas valve 10. The protrusion 22 acts together with the outer contour of the first side 13b of the valve body 13.

The invention also relates to gas control device comprising a safety gas valve, a servo gas valve, a servo gas pressure regulator and a main gas valve. The function and relationship of these four elements of a gas control device is well known to the person skilled in the art. All four elements are accommodated by a housing of the gas control device. When the safety gas valve is opened, gas can flow through the gas control device. When the safety gas valve is closed, the gas flow through the gas control device is stopped.

The main gas valve 10 controls the gas flow though the gas control device when the safety gas valve is opened. The main gas valve 10 is operated on basis of a servo gas pressure provided by the servo gas valve and the servo pressure regulator. A gas control device according to the present invention comprises a main gas valve 10 as described above.

LIST OF REFERENCE SIGNS 10 gas valve
11 valve seat
12 valve stem
12a first end
12b second end
13 valve body
13a first side
13b second side
14 valve diaphragm plate
15 valve diaphragm
16 valve spring element
16a end
16b end
17 tilt element
18 longitudinal axis
19 longitudinal axis
20 tilt axis
21 hinge
21a hinge head
21b hinge socket
22 protrusion
23 recess
24 anti-rotation element
25 longitudinal valve stem axis
26 recess
27 opening
28 outer edge
29 groove base
30 gap

What is claimed is:

1. A gas valve comprising:
a valve seat;
a valve stem;
a valve body,
wherein the valve stem is attached with a first end of the same to a first side of the valve body, the first end of the valve stem and/or the first side of the valve body providing a tilt element configured to allow the valve body to tilt around a defined tilt axis relative to the valve stem,
wherein the valve body acts together with the valve seat in such a way that the gas valve is closed when the valve body is pressed against the valve seat and that the gas valve is opened when the valve body is lifted up from the valve seat;
a valve spring element providing a spring dependent force acting on a second side of the valve body, wherein an end of the valve spring element is supported against the second side of the valve body;
a valve diaphragm plate mounted to a second end of the valve stem; and
a valve diaphragm mounted to the valve diaphragm plate,
wherein the second end of the valve stem and/or the valve diaphragm plate provides an anti-rotation element preventing the valve stem from rotating around a longitudinal valve stem axis,
wherein a first pressure is present on a first side of the valve diaphragm and a second pressure is present on a second side of the valve diaphragm,
wherein a pressure difference between the first pressure and the second pressure provides a pressure dependent force acting on the valve stem, and
wherein the gas valve opens and closes as a function of the pressure dependent force and spring dependent force both acting on the valve stem.

2. The gas valve according to claim 1, wherein a longitudinal axis of the valve spring element runs coaxial to a longitudinal axis of the valve seat.

3. The gas valve according to claim 1, wherein a longitudinal axis of the valve spring element runs coaxial to the longitudinal valve stem axis.

4. The gas valve according to claim 1, wherein the tilt axis for the valve body runs perpendicular and offset to a longitudinal axis of the valve seat.

5. The gas valve according to claim 1, wherein the tilt element is provided by a hinge between the first end of the valve stem and the first side of the valve body.

6. The gas valve according to claim 5, wherein the tilt element is further provided by a protrusion at the first end of the valve stem.

7. The gas valve according to claim 1, wherein the anti-rotation element is provided by an opening in the valve diaphragm plate through which the second end of the valve stem penetrates.

8. The gas valve according to claim 1, wherein in a fully closed status of the gas valve, the spring dependent force presses the valve body completely against the valve seat.

9. The gas valve according to claim 1, wherein in a fully opened status of the gas valve, the pressure dependent force lifts up the valve body completely from the valve seat.

10. The gas valve according to claim 1, wherein in a partially opened status of the gas valve, the pressure dependent force lifts up the valve body partially from the valve seat, in such a way that a first circumferential section of the valve body which is tilted away from the valve seat is lifted up from the valve seat while a second circumferential section of the valve body which is tilted towards the valve seat is pressed against the valve seat.

11. A gas control device comprising:
a safety gas valve;
a servo gas pressure regulator;
a servo gas valve; and
a main gas valve comprising:
a valve seat;

a valve stem;

a valve body, wherein the valve stem is attached with a first end of the same to a first side of the valve body, the first end of the valve stem and/or the first side of the valve body providing a tilt element configured to allow the valve body to tilt around a defined tilt axis relative to the valve stem, wherein the valve body acts together with the valve seat in such a way that the main gas valve is closed when the valve body is pressed against the valve seat and that the main gas valve is opened when the valve body is lifted up from the valve seat, a valve spring element providing a spring dependent force acting on a second side of the valve body, wherein an end of the valve spring element is supported against the second side of the valve body;

a valve diaphragm plate mounted to a second end of the valve stem; and a valve diaphragm mounted to the valve diaphragm plate, wherein the second end of the valve stem and/or the valve diaphragm plate provides an anti-rotation element preventing the valve stem from rotating around a longitudinal valve stem axis, wherein a first pressure is present on a first side of the valve diaphragm and a second pressure is present on a second side of the valve diaphragm, wherein a pressure difference between the first pressure and the second pressure provides a pressure dependent force acting on the valve stem; and wherein the main gas valve opens and closes as a function of the pressure dependent force and spring dependent force both acting on the valve stem.

12. The gas control device according to claim 11, wherein a longitudinal axis of the valve spring element runs coaxial to a longitudinal axis of the valve seat.

13. The gas control device according to claim 11, wherein a longitudinal axis of the valve spring element runs coaxial to the longitudinal valve stem axis.

14. The gas control device according to claim 11, wherein the tilt axis for the valve body runs perpendicular and offset to a longitudinal axis of the valve seat.

15. The gas control device according to claim 14, wherein in a partially opened status of the main gas valve, the pressure dependent force lifts up the valve body partially from the valve seat, in such a way that a first circumferential section of the valve body which is tilted away from the valve seat is lifted up from the valve seat while a second circumferential section of the valve body which is tilted towards the valve seat is pressed against the valve seat.

16. A gas valve comprising:

a valve seat;

a valve stem;

a valve body;

a valve diaphragm, wherein the valve body acts together with the valve seat in such a way that the gas valve is in a closed state when the valve body is pressed against the valve seat and that the gas valve is in an opened state when the valve body is lifted up from the valve seat, wherein the valve stem forms a connection between the valve diaphragm and the valve body that allows the valve body to tilt relative to the valve stem when the valve body is lifted up from the valve seat, wherein the valve stem is attached with a first end of the same to a first side of the valve body; and a biasing device providing a bias force that biases the gas valve toward the closed state, wherein an end of the biasing device is supported against a second side of the valve body, wherein a pressure difference between a first pressure present on a first side of the valve diaphragm and a second pressure present on a second side of the valve diaphragm provides a pressure dependent force acting on the valve stem, and wherein the gas valve opens and closes as a function of the pressure dependent force and the bias force.

17. The gas valve according to claim 16, wherein the connection between the valve stem and the valve body allows the valve body to tilt about a tilt axis, and wherein the tilt axis runs perpendicular to and offset from a longitudinal axis of the valve seat.

18. The gas valve according to claim 17, wherein in a fully closed state of the gas valve, the bias force of the biasing device presses the valve body completely against the valve seat.

19. The gas valve according to claim 18, wherein in a fully opened state of the gas valve, the pressure dependent force lifts up the valve body completely from the valve seat.

20. The gas valve according to claim 19, wherein in a partially opened state of the gas valve, the pressure dependent force lifts up the valve body partially from the valve seat, in such a way that a first circumferential section of the valve body which is tilted away from the valve seat is lifted up from the valve seat while a second circumferential section of the valve body which is tilted towards the valve seat is pressed against the valve seat.

* * * * *